(12) United States Patent
Pérez Romo et al.

(10) Patent No.: US 8,716,159 B2
(45) Date of Patent: May 6, 2014

(54) NON-DESTRUCTIVE PROCESS FOR THE ELIMINATION OF SILICON FROM ALUMINA BASED MATERIALS

(75) Inventors: Patricia Pérez Romo, México City (MX); José Marie Maurice Julien Fripiat, México City (MX); Luis Miguel Rodríguez Otal, México City (MX); Pedro Martín Vega Merino, México City (MX); María de Lourdes Alejandra Guzmán Castillo, México City (MX); Candido Aguilar Barrera, México City (MX); Héctor Armendáriz Herrera, México City (MX); Francisco Javier Hernández Beltrán, México City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 377 days.

(21) Appl. No.: 13/140,310

(22) PCT Filed: Dec. 9, 2009

(86) PCT No.: PCT/MX2009/000133
§ 371 (c)(1),
(2), (4) Date: Sep. 20, 2011

(87) PCT Pub. No.: WO2010/071393
PCT Pub. Date: Jun. 24, 2010

(65) Prior Publication Data
US 2012/0040822 A1 Feb. 16, 2012

(30) Foreign Application Priority Data

Dec. 17, 2008 (MX) .................. MX/A/2008/016198

(51) Int. Cl.
*B01J 38/52* (2006.01)
(52) U.S. Cl.
USPC .............................. 502/33; 502/514; 502/515
(58) Field of Classification Search
USPC ....................................... 502/33, 29, 514, 515
See application file for complete search history.

(56) References Cited

U.S. PATENT DOCUMENTS

| 4,239,735 A | 12/1980 | Eisele et al. |
| 4,304,575 A | 12/1981 | Payne |
| 4,560,541 A | 12/1985 | Davis |
| 4,973,462 A | 11/1990 | Akira et al. |
| 5,242,670 A | 9/1993 | Gehringer |

FOREIGN PATENT DOCUMENTS

FR      2020340      7/1970

OTHER PUBLICATIONS

Pacheco-Malagon G. et al., Local order in depolymerized silicate lattices, Inorganic Chemistry, 2005, vol. 44, No. 23, pp. 8486-8494.

*Primary Examiner* — Edward Johnson
(74) *Attorney, Agent, or Firm* — Roylance, Abrams, Berdo & Goodman, L.L.P.

(57) ABSTRACT

A method for eliminating silicon or silicon compounds in alumina based materials without destroying such alumina based materials enabling reutilization particularly in catalysts for hydrotreating processes, comprising: a) mixing alumina based solid material which contains silicon with an alcohol extraction agent at a temperature between 10 and 300° C., for 10 minutes to 96 hours to form a mixture; b) separating solids from the mixture by centrifugation, decantation or filtration to obtain separated solids; c) washing the separated solids with at least one of water, alcohol or an ammonium hydroxide solution to form washed solids; and d) drying the washed solids to obtain regenerated alumina based solid material.

20 Claims, 1 Drawing Sheet

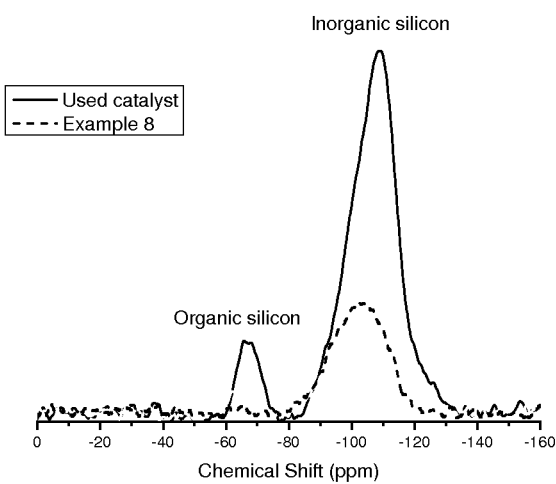

NON-DESTRUCTIVE PROCESS FOR THE ELIMINATION OF SILICON FROM ALUMINA BASED MATERIALS

FIELD OF THE INVENTION

This invention provides a process for the elimination of silicon and/or silicon compounds contained in alumina based materials, without destroying the alumina based material thus allowing for reusing it, while the main application of this process is the regeneration of silicon contaminated alumina based catalysts that are used in hydrotreating processes for the elimination of sulfur and silicon form hydrocarbon streams in the oil industry.

BACKGROUND OF THE INVENTION

There are varying procedures and/or methods already known that lead to eliminate silicon contained in alumina based materials, such as:
  a) U.S. Pat. No. 4,239,735 removes impurities from aluminas by solubilizing its contaminants and leaving the alumina in an insoluble phase. This is achieved by mixing kaolinite with at least 36 wt % of hydrochloride acid for dissolving impurities and converting the aluminum to insoluble aluminum chloride;
  b) U.S. Pat. No. 4,304,575 describes a process that silica particles can be dissolved by heating with an alkaline solution thus settling them and creating bigger particles creating a silica sol where most of the particles have a much bigger size as they have before the process;
  c) U.S. Pat. No. 4,560,541 refers to a method for eliminating soluble and non-soluble impurities, mainly sodium hydroxide and silica, by a reaction with stoichiometric amounts of hydrochloric acid in order to produce a reaction product such as chloride aluminum and aluminum chloride hexahydrate. After water addition, the solution is separated in order to eliminate insoluble impurities such as silica;
  d) U.S. Pat. No. 4,973,462 describes a process for producing high purity silica by the direct addition of an alkaline silicate aqueous solution (water glass) to a mineral acid solution such as hydrochloric acid, nitric acid and sulfuric acid, in order to dissolve the impurities in the mineral acid solution and produce a silica precipitate; and
  e) U.S. Pat. No. 5,242,670 details a process for the digestion of an inorganic silica/alumina matrix in order to produce silicon tetrafluoride and aluminum fluoride, in which the tetrafluoride in the gas phase or in solution contains aluminum fluoride and some other non-converted oxides.

It is important to note that the conventional procedures and/or methods already known for eliminating or removing silicon contained in alumina based materials such as those already referred here above, use inorganic acids or a mixture of inorganic acids in a digestion step, thus modifying the alumina and any other element herein contained, thus destroying and avoiding for reusing the alumina based material.

The process of this invention constitutes an improvement over prior technologies known to applicants, which process eliminates silicon and/or silicon compounds contained in alumina based materials without destruction of the alumina based material, thus allowing the alumina based material to be reused. The main application of the process of the present invention is the regeneration of silicon-contaminated alumina based catalysts which are used in hydrotreating processes of the oil industry for sulfur elimination and silicon removal from hydrocarbon streams.

Therefore, the present invention provides a non-destructive process for the elimination of silicon and/or silicon compounds that are contained in alumina based materials, without destroying the alumina based material, thus enabling the alumina based material to be reused.

Another aspect of the present invention is to provide a non-destructive process for the breakdown and elimination of silicon and/or silicon compounds that are contained in alumina based materials, and is mainly employed for the regeneration of alumina based catalysts, used as silicon traps in hydrotreating processes of the oil industry, preferable in the hydrodesulfurization (HDS) processes of naphthas produced in a delayed coking process (coker naphthas).

Another aspect of the present invention, is to provide a non-destructive process for silicon breakdown and elimination of silicon and/or silicon compounds that are contained in alumina based materials, which process can break down the silicon compounds found as inorganic structures, as oxides or silanols: $Si-(OX)_4$ (X=Al, H, Si) and/or as organic structures as organosilanes: $(OX)_3-Si-CH_3$ and/or $(CH_3)_2-Si-(OX)_2$ (X=H, Si), without modifying the properties of the alumina based material.

Additionally, another subject matter of the present invention, is to provide a non-destructive process for breakdown and elimination of silicon and/or silicon compounds that are contained in alumina based materials, using an extraction agent that selectively breaks down the silicon compounds that are present in alumina based materials, without modifying substantially other materials or metals that might be present in such alumina based material.

These and other subject matters of the present invention will be established with more clarity and detail in the next chapters.

BRIEF DESCRIPTION OF THE DRAWING

FIG. 1 shows the Nuclear Magnetic Resonance Spectra of $^{29}Si$ present in the contaminated catalyst of Table No. 1 (which contains 10 wt % silicon) as well as for the regenerated catalyst from Example 8 (which contains 3.6 wt % silicon).

SUMMARY OF THE INVENTION

The present invention involves a method for eliminating silicon or silicon compounds that are contained in alumina based materials without destroying such alumina based materials, which enables their reutilization. The present invention involves a non-destructive method for silicon elimination from alumina based materas without destroying such alumina based materials, which comprises :a) mixing alumina based solid material which contains silicon with an alcohol extraction agent at a temperature between 10 and 300° C. for 10 minutes to 96 hours to form a mixture; b) separating solids from the mixture by centrifugation, decantation or filtration to obtain separated solids; c) washing the separated solids with at least one of water, acohol or an ammonium hydroxide solution to form washed solids; and d) drying the washed solids to obtain regenerated alumina based solid material.

The main application of the present process is regeneration of alumina based catalysts contaminated with silicon, whch are used in hydrotreating processes in the oil industry for sulfur elimination and silicon removal from process streams. The present process constitutes an improvement over prior processes for the eliminaton and removal of silicon contained in alumina based materials, since such prior processes use inorganic acids in a digestion process which modifies the properties of alumina and of any other element contained in the material, thus destroying the alumina and preventing its reutilization. The non-destructive method of the present invention is characterized by an extraction agent that depolymerizes the silicon compounds deposited in alumina based materials, without modification of the properties of the alumina based material and with no substantial modification of other materials or the metal content present in the alumina based material.

The extraction agent used is an alcohol, preferably a polyol and more preferably glycerol, which are commercially available, since a high grade of purity is not required for its use in the present process. The silicon contained in alumina based materials, in which the non-destructive method of the present invention is used, is preferably found in inorganic structures such as oxide or silanol: $Si$-$(OX)_4$ (X=Al, H, Si) and/or as organosilanes structures: $(OX)_3$—$Si$—$CH_3$ and/or $(CH_3)_2$—$Si$—$(OX)_2$ (X=H, Si), both are depolymerized when this removal method is used.

DETAILED DESCRIPTION OF THE INVENTION

This invention provides a process for the elimination of silicon or silicon compounds contained in alumina based materials, without destruction of such alumina based materials, thus allowing for such alumina based material to be reused. The main application of this process is the regeneration of alumina based catalysts. It is important to mention that the said catalysts are used for sulfur and silicon elimination from process streams in hydotreating processes in the oil industry preferably in hydrodesulfurization (HDS) of naphthas produced in the delayed coking process (coker naphthas).

The non-destructive process of this invention consists of the following steps a) mixing the alumina based material or a mixture of such materials that contain silicon which can be in the form of extrudates, crushed particles or powder, with an extraction agent, preferably an alcohol, in a temperature range between 10 to 300° C., for a period of time from 10 min to 96 h; b) separating the mixture that contains the solids, the extraction liquid and dissolved silica by means of centrifugation, decantation or filtration; c) washing the recovered solids using water and/or alcohol and/or an 1 to 35 wt % ammonium hydroxide solution; and d) drying the recovered solids.

The non-destructive process of the present invention is used with alumina based materials that may contain among others the following chemical elements or mixtures of them: V, Cr, Mn, Fe, Co, Ni, Cu, Zn, Zr, Nb, Mo, Ru, Rh, Pd, Ag, Cd, W, Re, Os, Ir, Pt and Au.

The silicon contained in the alumina based material might be found in inorganic form as an oxide and a silanol: $Si$—$(OX)4$ (X=Al, H, Si) or in organic form as organosilanes: $(OX)_3$—$Si$—$CH_3$ and/or $(CH_3)_2$—$Si$—$(OX)_2$ (X=H, Si). Both forms of silicon structures are broken down by the process of the present invention.

The extraction agent used to mix with the solid alumina based material that contains silicon is an alcohol such as a polyol, more preferably glycerol, which exhibits the most suitable properties allowing for a selective extraction of the silicon by decomposing the silicon compounds present in such alumina based materials without modification of the properties of the alumina based material nor modification of other materials or metals that might be present in the alumina based material. This is due to the fact that the glycerol breaks down the silicon compounds deposited in the surface of the alumina based material thus producing a silica gel compound which is extracted from the alumina based material.

For the step a) mixing of the non destructive process of this invention, the reaction is carried out at a temperature between 10 and 300° C. preferably between 160-280° C., during a period of 10 minutes to 96 hours, preferably, 1 to 18 h.

The washing step is carried out preferably with distilled water and/or methanol and/or a 1 to 35 wt % ammonium hydroxide solution, more preferably with a 35 wt % ammonium hydroxide solution.

The described process may be carried out either in a batch with or without stirring or in a continuous packed bed reactor, from pressures from 0.5 to 60 kg/cm².

Using a reactor in a continuous flow packed bed reactor, the non-destructive process of this invention has the following steps: a) pack the reactor with the solid material or the mixture of solid materials which contain silicon, in the form of extrudates, crushed particles or powder, and adjust the pressure to 0.5 to 60 kg/cm², then increase the temperature up to the reaction temperature, then start feeding the extraction agent, preferably glycerol, at a flow rate of 1 to 500 mL/h per gram of solid and maintain such conditions for 1 to 36 h; b) stop feeding the extraction agent and let the system to cool down; c) wash the solid material by feeding an alcohol such as methanol at a rate of 1 to 500 mL/h per gram of solid, preferably 1 to 160 mL/h, for 30 min to 24 h, stop feeding alcohol and let the system to cool down to 10 to 25° C., adjust pressure to 0.5 to 1 60 kg/cm², and d) dry the recovered solid.

Following the non-destructive process of this invention in a continuous flow packed bed tubular reactor, pressurization and cooling should be done preferably using nitrogen.

EXAMPLES

In order to have a better understanding on the present invention and without limiting the scope of it, some useful examples are described hereafter.

Example 1

A sample of a used and silicon contaminated catalyst obtained from a hydro-treatment industrial plant that process a coker naphtha feed was analyzed for determining silicon, coke, molybdenum and nickel contents thus producing the following results as shown in Table 1:

TABLE 1

Chemical analysis and TSA (BET method) of a used catalysts recovered from a hydrotreating plant processing a coker naphtha feed.

| Mo:Ni (wt:wt) ratio | Silicon as Si, wt % | Coke as C, wt % | TSA m²/g |
|---|---|---|---|
| 5.2 | 10 | 3.1 | 116 |

4 g of this used catalyst was crushed to an average particle size of 60 mesh and mixed with 200 mL of glycerol in a batch reactor, then heated up from 15° C. to 260° C. under stirring at 100 rpm during 6 hours, then cooled down to 100° C., and the solid phase was separated from the glycerol by centrifugation and washed with 200 mL of a 35 wt % of ammonium hydroxide solution. Finally, the solid was oven dried at a temperature of about 60° C. for 8 hours. The solid was analyzed by Nuclear Magnetic Resonance and Atomic Absorption thus determining that the silicon content decreased in 48 wt % w.r.t. that of the used catalyst (10 wt %).

Example 2

4 g of the used catalyst from Example 1 was crushed to an average particle size of 60 mesh and mixed with 80 ml glycerol in a batch reactor, then heated up from 15° C. to 220° C. under stirring at 100 rpm during 2 hours, then cooled down to 130° C., and the solid phase was separated from the glycerol by centrifugation and washed with 120 mL of a 35 wt % ammonium hydroxide solution. Finally the solid was oven dried at a temperature of about 60° C. for 7 hours. The solid was analyzed by Nuclear Magnetic Resonance and Atomic Absorption thus determining that the silicon content decreased in 31 wt % w.r.t. that of the used catalyst from Example 1 (10 wt %). By atomic absorption a Mo/Ni ratio of 5.5 was determined for this catalyst, which indicates that the total amount of metals was not substantially modified.

Example 3

4 g of the used catalyst of Example 1 was crushed to an average particle size of 60 mesh and mixed with 200 mL of glycerol in a batch reactor, then heated up from 15° C. to 220° C. under stirring at 100 rpm during 6 hours, then cooled down to 130° C., and the solid phase was separated from the glycerol by centrifugation and washed with 200 mL of a 35 wt % ammonium hydroxide solution. Finally the solid was oven dried at 60° C. for 7 hours. This solid was analyzed by Nuclear Magnetic Resonance and Atomic Absorption thus determining that the silicon content decreased in 39 wt % w.r.t. the silicon contained in the used catalyst from Example 1 (10 wt %).

Example 4

1 g of the catalyst of Example 1 was crushed to an average particle size of 100 mesh and mixed with 50 mL of glycerol in a batch reactor, then heated up from 15° C. to 250° C. under stirring at 100 rpm during 4 hours, then cooled down to 160° C., and the solid phase was separated from the glycerol by centrifugation and washed with 100 mL distilled water. Finally, the solid was oven dried at a temperature of about 60° C. for 10 hours. This solid was analyzed by Nuclear Magnetic Resonance and Atomic Absorption thus determining that the silicon content decreased in 27 wt % w.r.t. the silicon contained in the used catalyst from Example 1 (10 wt %).

Example 5

1 g of the catalyst of Example 1 was crushed to an average particle size of 60 mesh and mixed with 50 mL of glycerol in a batch reactor, then heated up from 15° C. to 250° C. under stirring at 100 rpm during 4 hours, then cooled down to 160° C., and the solid phase was separated from the glycerol by centrifugation and washed with 100 mL of 35 wt % ammonium hydroxide solution. Finally, the solid was oven dried at a temperature of about 80° C. for 6 hours. This solid was analyzed by Nuclear Magnetic Resonance and Atomic Absorption thus determining that the silicon content decreased in 35 wt % w.r.t. the silicon contained in the used catalyst from Example 1 (10 wt %).

Example 6

4 g of the catalyst of Example 1 was mixed with 200 mL of glycerol in a batch reactor, then heated up from room temperature to 260° C. under stirring at 100 rpm during 6 hours, then cool down to 100° C., and the solid phase was separated from the liquid phase by decantation and dispersed once again in 200 ml of glycerol, heated up from room temperature to 260° C. under stirring at 100 rpm for 4 hours, cooled down to 80° C., and the solid was separated from the glycerol by decantation and washed with 300 mL of a 35 wt % ammonium hydroxide solution. Finally, the solid was oven dried at a temperature of about 60° C. for 8 hours. This solid was analyzed by Nuclear Magnetic Resonance and Atomic Absorption thus determining that the silicon content decreased in 53 wt % w.r.t. the silicon contained in the used catalyst from Example 1 (10 wt %).

Example 7

4 g of the catalyst of Example 1 was mixed with 200 mL of glycerol in a batch reactor, then heated up from room temperature to 250° C. under stirring at 100 rpm during 5 hours, then left to cool down to 120° C., and the solid phase was separated from the glycerol by decantation and once again mixed with 200 mL more glycerol, heated up from room temperature to 250° C. under stirring at 100 rpm for 5 hours, left to cool down to 90° C., separated from the liquid phase by decantation and washed with 300 mL of distilled water. Finally, the solid was oven dried at a temperature of about 60° C. for 10 hours. This solid was analyzed by Nuclear Magnetic Resonance and Atomic Absorption thus determining that the silicon content decreased to 5.3 wt %, let say 47% lower w.r.t. the silicon contained in the used catalyst from Example 1 (10 wt %).

Example 8

4 g of the catalyst of Example 1 in the extrudated form was mixed with 200 mL of glycerol in a batch reactor, then heated up from room temperature to 260° C. under stirring at 100 rpm during 6 hours, then cooled down to 130° C., and the solid was separated from the liquid phase by decantation and once again dispersed in 200 mL of glycerol, heated up from room temperature to 260° C. under stirring at 100 rpm for 6 hours, left to cool down to 80° C., separated from the liquid phase by decantation and washed with 300 mL of distilled water. Finally, the solid was oven dried at a temperature of about 60° C. for 8 hours. This solid was analyzed by Nuclear Magnetic Resonance (FIG. 1) and Atomic Absorption thus determining that the silicon content decreased to 3.6 wt %, let say 64% lower w.r.t. the silicon contained in the used catalyst from Example 1 (10 wt %).

FIG. 1 presents the Nuclear Magnetic resonance spectra for the used catalyst of example 1 and the regenerated catalyst of Example 8. The $^{29}Si$ resonance bands in the used catalyst (containing 10 wt % silicon) are much more intense than in the regenerated catalyst (containing 3.6 wt % silicon). The amount of silicon presented in both materials is proportional to the area under the curve. On the other side, the main resonance band at −105-110 ppm is formed by the contribution of $Si-(OSi)_4$ species and $X-O-Si-(OSi)_3$ links (where X=Al or H). It can be observed that the position (chemical displacement) of this band is displaced to a lower energy field in the regenerated catalyst of Example 8 compared to the used catalyst of Example 1 thus showing that $Si-(OSi)_4$ species are eliminated. Moreover, the band at −67.2 ppm produced by organic silicon $CH_3-Si-(OX)_3$ (X=H, Si) disappeared in the regenerated catalyst.

Example 9

7 g of the catalyst of Example 1 was crushed and sieved to an average particle size of 40 mesh, then packed in a tubular reactor and pressurized to 0.8 kg/cm² with nitrogen, heated up from room temperature to 180° C., at a rate of 60° C./min, then glycerol was fed at a rate of 210 mL/h while increasing temperature up to 260° C. at a rate of 60° C./h and a pressure of 0.8 kg/cm², maintaining such conditions for 6 hours, switched feeding from glycerol to nitrogen, cool down from 260° C. to 100° C., at a rate of 180° C./h, increase pressure to 5 kg/cm², then feed methanol at a rate of 140 mL/h for 2 hours, then cool down to room temperature and low pressure to atmospheric pressure. The solid was recovered and oven dried at 100° C. for 5 hours. This solid was analyzed by Nuclear Magnetic Resonance and Atomic Absorption thus determining that the silicon content decreased to 6.5 wt %, let say 36% lower w.r.t. the silicon contained in the used catalyst from Example 1 (10 wt %).

Example 10

7 g of the used catalyst of Example 1 was crushed to particles of 60 mesh size and packed into a continuous flow tubular reactor, increase pressure to 25 kg/cm² using nitrogen, then follow the same steps as for Example 9, the glycerol feed being at 70 mL/h, then keep the same pressure and temperature for 10 h. The obtained solid was analyzed by Nuclear Magnetic Resonance and by Atomic Absorption, thus determining that the silicon content decreased in 51.3 wt % w.r.t. the silicon contained in the used catalyst from Example 1 (10 wt %).

Example 11

7 g of used catalyst of Example 1 was crushed to particles of 60 mesh size and packed into a continuous flow tubular reactor, then the pressure was increased up to 50 kg/cm² using Nitrogen, then following the steps as for example 9, the glycerol was fed at a rate of 70 mL/h, and the temperature was increased up to 200° C., at a rate of 60° C./h, then same pressure and temperature were kept for 30 hours. The solid obtained was analyzed by Nuclear Magnetic Resonance and by Atomic Absorption, thus determining that the silicon content was 24.3 wt % of the silicon contained in the used catalyst in Example 1 (10 wt %).

In order to visualize better the advantages of the non-destructive method of the present invention, Table 2 summarizes the results reported in Examples 1 to 11, which are shown in an illustrative manner but not restrictive.

The results of Table 2 show that the non-destructive method of the present invention produces a higher silicon (Si) elimination (up to 64% of Si) from the contaminated catalyst when a batch reactor and sequential treatments are used, compared to a packed bed continuous flow tubular reactor (elimination up to 51.3% of Si) or a batch reactor and a single step treatment (elimination up to 48% of Si).

TABLE No. 2

Results of examples for Silicon (Si) removal from a used catalyst that contains 10 wt % Si, obtained from a hydrotreating plant processing coker naphthas.

| Regenerated Catalyst | Reactor type/treatments | Silicon (Si), wt % | % Silicon (Si) eliminated from used catalyst |
|---|---|---|---|
| Used | | 10 | 0 |
| Regenerated Catalysts | | | |
| Example 1 | Batch/single treatment | 5.20 | 48.00 |
| Example 2 | Batch/single treatment | 6.90 | 31.00 |
| Example 3 | Batch/single treatment | 6.10 | 39.00 |
| Example 4 | Batch/single treatment | 7.30 | 27.00 |
| Example 5 | Batch/single treatment | 6.50 | 35.00 |
| Example 6 | Batch, two sequential treatments | 4.70 | 53.00 |
| Example 7 | Batch, two sequential treatments | 5.30 | 47.00 |
| Example 8 | Batch, two sequential treatments | 3.60 | 64.00 |
| Example 9 | Continuous flow | 6.45 | 35.50 |
| Example 10 | Continuous flow | 4.87 | 51.30 |
| Example 11 | Continuous flow | 7.57 | 24.30 |

In order to show the applicability of the non destructive process of the present invention, the Example 12 was done:

Example 12

0.5 g of used catalyst of Example 1 was crushed to particles of 60 mesh size and mixed with 25 mL water and refluxed for 90 min. Afterwards, the solid was filtered and 25 mL of ethanol were added then reflux for 20 minutes. The solid was filtered and dried at 60° C. The solid was analyzed by Nuclear Magnetic Resonance and by Atomic Absorption, thus determining that the silicon content was 8.3 wt % of the silicon contained in the used catalyst in Example 1 (10 wt %).

In comparison with the previous results reported in Examples 1 to 11, Example 12 leads to show the following relevant aspects of the non-destructive method of this invention:

a) Advantages are when this process is carried out in a batch reactor with or without stirring or under a continuous flow under or without pressure, since this method eliminates up to 64 wt % of the initially silicon (Si) contained in the used catalyst when a batch reactor an two sequential treatments are used, it eliminates up to 51.3 wt % Si when a continuous flow packed bed reactor is used and up to 48 wt % Si is eliminated when a batch reactor and a single treatment are used.

b) The importance of each of the stages that are part of the method of the present invention as well as the operating conditions that take place.

c) The properties of the extraction agent that is used, preferably an alcohol such as a polyol, and more preferably glycerol, in order to selectively break down the silicon compounds that are present in the alumina based materials, producing no substantial modification of the content of other materials or metals that are present in the alumina based material.

In order to show the catalytic activity of the regenerated catalysts produced by the non-destructive method of the present invention, the following tests were done:

Example 13

A sample of fresh hydrotreating catalyst (the corresponding fresh catalyst of the used catalyst of Example 1), was subject to a chemical analysis thus obtaining a Mo/Ni molar ratio of 5.2, the silicon and carbon content was nil. The Total Surface Area (BET Method) was 307 m²/g. This catalyst was crushed into particles of size 60 mesh, packed in a tubular reactor and sulfided with a $CS_2$-naphtha feed containing 0.5 wt % S under the following conditions:

| | |
|---|---|
| Stabilization time | 16 h |
| Pressure | 55 kg/cm$^2$ |
| Temperature | from 150° C. up to 315° C. at a rate of 20° C./h |
| Naphtha + CS$_2$ flow rate | 21 mL/h |
| Hydrogen Flow rate | 121 mL/min (7.26 l/h)@STD |

Subsequently, the catalyst was tested in order to determine its catalytic activity using the naphtha whose properties are shown in Table 3, under the following conditions:

| | |
|---|---|
| Mass of catalyst | 9.87 g |
| Temperature | 180 and 260° C. |
| Naphtha feed rate | 21 mL/h |
| Hydrogen Flow rate | 121 ml/min@STD |

The results of the test were compared for the elimination of sulfur (wt %) and total nitrogen (ppm), mono-olefins (Bromine Nbr.) and diolefins (% conjugated dienes) and for silicon (Si, ppm) in the product.

It is important to mention that Hydrodesulphurization (HDS) schemes for processing coker naphthas are frequently designed with a number of cascade reactors among them the so called silicon trap reactor, where a HDS catalyst retains the silicon that is entrained in the naphtha feed. Currently, the HDS catalysts used as silicon traps are also active for hydrodesulphurization, denitrogenation and hydrogenation of monolefins and diolefins. They produce the conversion of silicon compounds contained in the feed and retain the silicon that is produced thereby. However, silicon deposition accelerates catalysts deactivation. It is important for these catalysts to retain silicon as well as to convert the nitrogen, sulfur and olefinic compounds contained in the feed. Hydrodesulphurization and hydrodenitrogenation reactions are favored above 300° C., while the silicon trap reactor operates under 280° C. and the hydrogenation of olefins under 180° C.

TABLE 3

Results of the catalytic activity testing of the fresh catalyst using a industrial naphtha feed.

| | | Product at reaction temperature | |
|---|---|---|---|
| Property | Feed | 180° C. | 260° C. |
| Sulfur as S, wt % | 0.329 | 0.301 | 0.008 |
| Total N, ppm | 25 | 3 | <0.3 |
| Bromine Nbr. | 26.78 | 21.35 | 1.82 |
| % conjugated dienes | 0.35 | 0.26 | <0.1 |
| Silicon as Si, ppm | 336 | 8.1 | 8.1 |

These results show that the fresh catalyst has a better catalytic activity at 260° C. for HDS, HDN and monolefins and diolefins hydrogenation, while silicon removal is the same either at 180° C. or 260° C.

Example 14

A sample of the used catalyst of Example 1 was crushed to particles of 60 mesh size, then packed in a tubular reactor, and tested in order to determine its catalytic activity, using the conditions and feed used in Example 13. The results of this test are shown in Table 4.

TABLE 4

Results of the catalytic activity testing of the used catalyst using an industrial naphtha feed.

| | | Product at reaction temperature | |
|---|---|---|---|
| Property | Feed | 180° C. | 260° C. |
| Sulfur as S, wt % | 0.329 | 0.303 | 0.089 |
| Total N, ppm | 25 | 8 | 6 |
| Bromine Nbr. | 26.78 | 23.44 | 7.98 |
| % conjugated dienes | 0.35 | 0.29 | <0.1 |
| Silicon as Si, ppm | 336 | 165.4 | 175.04 |

The results in Table No. 4 show that the used catalyst has a moderate activity w.r.t the fresh catalyst of Example 13 and Table 3 for HDS, HDN, olefins hydrogenation and silicon removal.

Example 15

The catalysts that were regenerated in Examples 6 and 7 were crushed to particles of 60 mesh size while the regenerated catalyst of Example 8 was used as extruded. These samples were tested following conditions of Example 13 including sulfiding. The results of these tests are shown in Table 5.

TABLE 5

Results of the catalytic activity testing of the regenerated catalysts from Examples 6, 7 and 8 using industrial feed naphtha as a feed.

| | Reaction at 180° C. with the regenerated catalyst from Example | | | Reaction at 260° C. with the regenerated catalyst from Example | | |
|---|---|---|---|---|---|---|
| Property | 6 | 7 | 8 | 6 | 7 | 8 |
| Sulfur as S, wt % | 0.325 | 0.288 | 0.265 | 0.061 | 0.062 | 0.080 |
| Total N, ppm | 12 | 13 | 1 | 5 | 10 | 5 |
| Bromine Nbr. | 11.73 | 20.02 | 23.8 | 4.96 | 10.51 | 7.72 |
| % conjugated dienes | <0.01 | 0.48 | 0.41 | <0.01 | <0.01 | <0.01 |
| Silicon as Si, ppm | 23.69 | 32.45 | 60.10 | 17.94 | 29.15 | 76.03 |

Results of Table 5 show that the regenerated catalysts produced in batch reactors considerably recovered their catalytic activity for HDS, HDN as well as for monolefins and diolefins saturation and for retaining silicon either at 180° C. or 260° C.

Hydrodesulphurization, hydrodenitrogenation of hydrocarbons and monolefins and diolefins saturation are in general favored at 260° C.

Comparing the performance of the regenerated catalysts (Table 5) with the fresh catalyst (Table 3) and with the used catalyst (Table 4) it is shown that the regenerated catalysts recovered their catalytic activity considerably at 180° C. as well as at 260° C., removing a high silicon percentage w.r.t. the used catalyst.

It is important to mention that the non-destructive method of the present invention have no substantial effect on the metal other than silicon contents in the alumina based catalyst, a feature that is confirmed by the hydrotreating activity and the olefins saturation activity, implying that the metal ratio has not changed significantly.

Example 16

The regenerated catalyst from Examples 9, 10, 11 where packed in a tubular reactor and sulfided at the same operating conditions of Example 13.

The catalysts were tested using the naphtha which properties are shown in Table 6, under the following conditions:

| Catalyst mass | 7 g |
| --- | --- |
| Temperature | 260° C. |
| Feed | naphtha |
| Feed rate | 21 mL/h |
| Hydrogen Flow rate | 121 ml/min@STD |

Results were compared in terms of sulfur (wt %), total nitrogen (ppm), monoolefins (Bromine Nbr.) and diolefins (% conjugated dienes) and silicon (Si, ppm) in the product.

TABLE 6

Results of the catalytic activity testing at 260° C. reaction temperature of the regenerated catalysts from Examples 13, 14 and 15 using an industrial feed naphtha as a feed.

| | | Regenerated catalyst from | | |
| --- | --- | --- | --- | --- |
| Property | Feed | Example 13 | Example 14 | Example 15 |
| Sulfur as S, wt % | 0.398 | 0.091 | 0.072 | 0.077 |
| Total N, ppm | 15 | 2 | 2 | 2 |
| Bromine Nbr. | 31.74 | 12.87 | 10.7 | 11.04 |
| % conjugated dienes | 0.04 | <0.01 | <0.01 | <0.01 |
| Silicon as Si, ppm | 9.46 | 0.73 | 0.59 | 0.4 |

The results of Table 6 show that using a continuous flow reactor the regenerated catalysts presented activity for hydrodesulphurization and hydrodenitrogenation of hydrocarbons, for saturation of monoolefins and diolefins, and removal of silicon.

In order to have a better understanding of the catalytic activity of the regenerated catalysts produced by the method of the present invention, the main results obtained in the testing of the regenerated catalysts, the fresh catalyst and the used catalyst are compared in Table 7.

TABLE No. 7

Summary for activity for silicon removal in naphthas with fresh, used and the regenerated catalysts from the examples presented in this patent application; reaction test at 260° C. using an industrial naphtha containing 336 ppmw Si.

| | | Naphta Product (Fresh Catalyst) Reaction Temperature | | | |
| --- | --- | --- | --- | --- | --- |
| | Feed Naphta | 180° C. | Reduction of Silicon content (%) | 260° C. | Reduction of Silicon content (%) |
| Si (ppm) | 336 | 8.08 | 97.60 | 8.11 | 97.59 |

| | | Naphta Product (Used Catalyst) Reaction Temperature | | | |
| --- | --- | --- | --- | --- | --- |
| | Feed Naphta | 180° C. | Reduction of Silicon content (%) | 260° C. | Reduction of Silicon content (%) |
| Si (ppm) | 336 | 165.4 | 50.77 | 175.04 | 47.90 |

| | | Naphta Product (Regenerated Catalyst) Temperature of Reaction | | | |
| --- | --- | --- | --- | --- | --- |
| Example number | Feed Naphta | 180° C. | Reduction of Silicon content (%) | 260° C. | Reduction of Silicon content (%) |
| 6 | Si (ppm) | 336 | 23.69 | 92.95 | 17.94 | 94.66 |
| 7 | | 336 | 32.45 | 90.34 | 29.15 | 91.32 |
| 8 | | 336 | 60.10 | 82.11 | 76.03 | 77.37 |
| 13 | | 9.46 | — | — | 0.73 | 92.28 |
| 14 | | 9.46 | — | — | 0.59 | 93.76 |
| 15 | | 9.46 | — | — | 0.40 | 95.77 |

Table 7 shows that while the fresh catalyst reduce silicon in the feed by 98 wt %, the regenerated catalysts produced by the non-destructive method of the present invention, reduce up to 96 wt % the silicon contained in the feed.

What it is claimed is:

1. A non-destructive method for silicon elimination from alumina based materials without destroying such alumina based materials, which comprises: a) mixing alumina based solid material which contains silicon with an alcohol extraction agent at a temperature between 10 and 300° C., for 10 minutes to 96 hours to form a mixture; b) separating solids from the mixture by centrifugation, decantation or filtration to obtain separated solids; c) washing the separated solids with at least one of water, alcohol or an ammonium hydroxide solution to form washed solids; and d) drying the washed solids to obtain regenerated alumina based solid material.

2. A non-destructive method according to claim 1, wherein the alumina based solid material of step a) is in the form of extrudates, crushed particle or powder.

3. A non-destructive method according to claim 1, wherein silicon contained in the alumina based materials is dissolved and eliminated and the silicon in the form of at least one of an inorganic oxide, silanol having the formula $Si-(OX)_4$, wherein X represents Al, H or Si or an organosilane having the formula $(OX)_3-Si-CH_3$ or $(CH_3)_2-Si-(OX)_2$, wherein X represents H or Si.

4. A non-destructive method according to claim 1, wherein the extraction agent is a polyol.

5. A non-destructive method according to claim 4, wherein the polyol is glycerol.

6. A non-destructive method according to claim 1, wherein the reaction in step a) is carried out at a temperature between 160° C. and 280° C., for 1 to 18 hours.

7. A non-destructive method according to claim 1 wherein step c) is conducted with at least one of distillated water, methanol or from 1 to 35 wt% ammonium hydroxide solution.

8. A non-destructive method according to claim 1, wherein step a) is carried out in a batch reactor (by portions), with or without stirring or in a continue reflux reactor and without pressure or under pressure from 0.5 until 60 kg/cm$^2$.

9. A non-destructive method according to claim 1, wherein step a) is conducted in successive treatments in a batch reactor.

10. A non-destructive method according to claim 1, wherein step a) is conducted in a single treatment in a batch reactor.

11. A non-destructive method according to claim 1, wherein step a) is conducted in a continuous flow reactor to which a glycerol extraction agent is fed at a flow rate of 1 to 500 mL/h per gram of solid material, under pressure for 1 to 36 hours; discontinuing feeding the extraction agent and reducing the temperature in the continuous flow reactor; washing the solid material by feeding methanol to the continuous flow reactor at a flow rate of 1 to 500 mL/h per gram of solid material, dicontinuing the feeding of methanol to the continuous flow reactor and reducing the temperature and adjusting the pressure to between 0.5 to 1 kg/cm$^2$ and drying the solid recovered from the continuous flow reactor.

12. A non-destructive method according to claim 11, wherein an inert gas is used to reduce the temperature and adjust the pressure of the system.

13. A non-destructive method according to claim 12, wherein the inert gas is nitrogen.

14. A non-destructive method according to claim 1, wherein the regenerated alumina based material is used as a catalyst in silicon traps in hydrotreating processes.

15. A non-destructive method according to claim 1, wherein regenerated alumina based material reduces up to 96 wt % the concentration of silicon naphtha, when used as a hydrotreating catalyst.

16. A non-destructive method according to claim 1, wherein the non-destructive method has no effect on the catalytic properties of the treated materials and the alumina based material can contain at least one of the following metals: Si, V, Cr, Mn, Fe, Co, Ni, Cu, Zn, Zr, Nb, Mo, Ru, Rh, Pd, Ag, Cd, W, Re, Os, Ir, Pt and Au.

17. The method of claim 1, wherein the regenerated alumina based material is used as a catalyst for the hydrodesulfurization of naphthas.

18. The method of claim 17, wherein said naphthas are coker naphthas.

19. A non-destructive method for regeneration of a used alumina based hydrotreating catalyst to remove silicon and enable its reuse, which comprises: a) mixing used alumina based hydrotreating catalyst, which contains silicon in the form of at least one of an inorganic oxide, silanol having the formula Si-(OX)$_4$, wherein X represents Al, H or Si or an organosilane having the formula (OX)$_3$—Si—CH$_3$ or (CH$_3$)$_2$—Si—(OX)$_2$, wherein X represents H or Si, with gycerol at a temperature between 10 and 300° C., for 10 minutes to 96 hours to breakdown silica compounds in the surface of the alumina based hydrotreating catalyst to form a silica gel compound, and form a mixture; b) separating solids from the mixture by centrifugation, decantation or filtration to obtain separated solids; c) washing the separated solids with an ammonium hydroxide solution to form washed solids; and d) drying the washed solids to obtain a regenerated alumina based catalyst.

20. The method of claim 19, wherein the used alumina based hydrotreating catalyst is continuously mixed with glycerol in a continuous flow reactor and the glycerol is discontinued to permit cool down prior to step c).

* * * * *